June 12, 1956   R. W. PARKER ET AL   2,749,996
SWEEPER DRIVE WHEEL RAISING MEANS
Filed Feb. 7, 1952   2 Sheets-Sheet 1
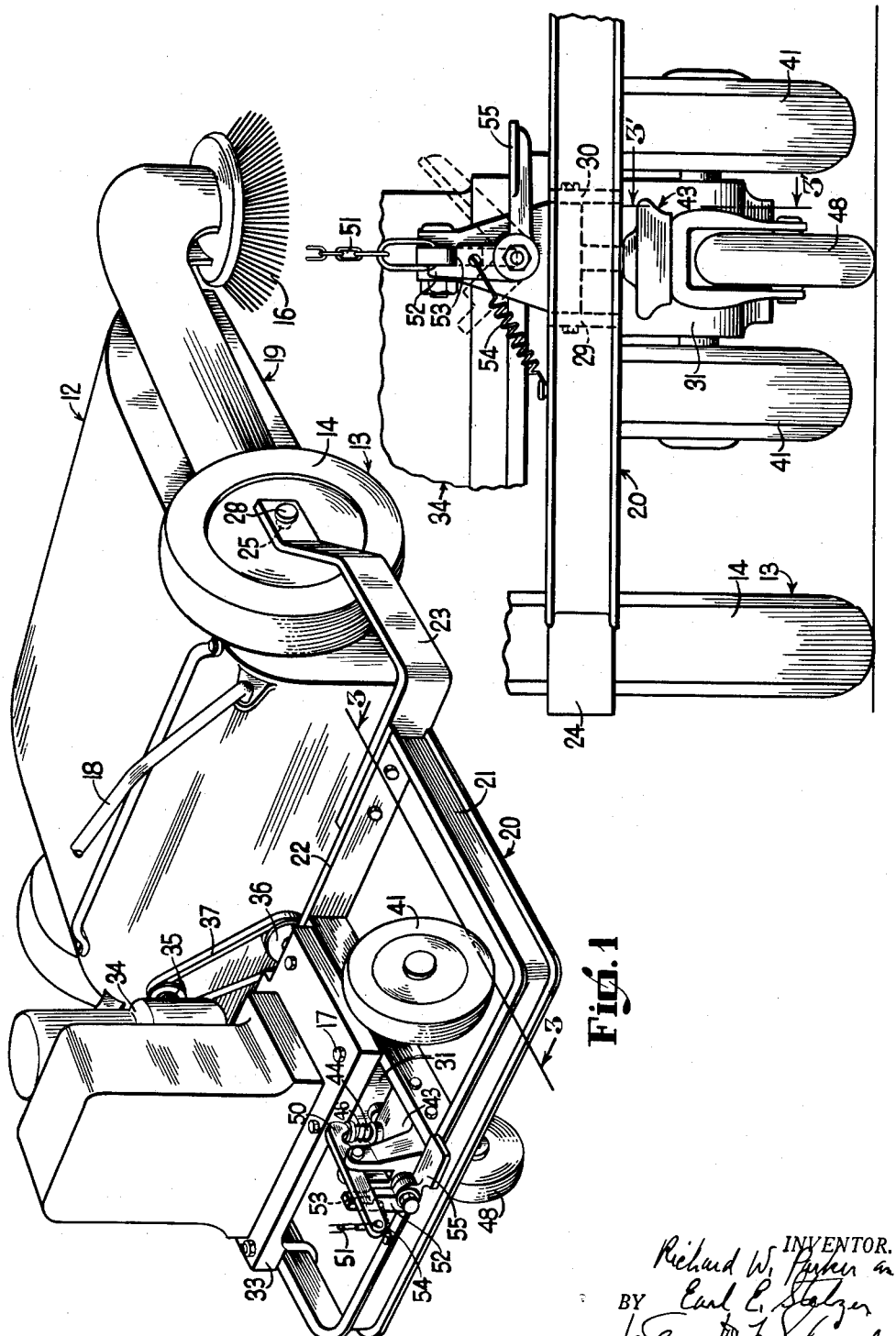
INVENTOR.
Richard W. Parker and
BY Earl E. Stolzer
Warren M. F. Schmeding
Attorney June 12, 1956    R. W. PARKER ET AL    2,749,996
SWEEPER DRIVE WHEEL RAISING MEANS
Filed Feb. 7, 1952    2 Sheets-Sheet 2

INVENTOR.
Richard W. Parker and
Earl E. Stolzer
BY Warren M. F. Schmucker
Attorney

United States Patent Office 2,749,996
Patented June 12, 1956

2,749,996
SWEEPER DRIVE WHEEL RAISING MEANS

Richard W. Parker and Earl E. Stelzer, Springfield, Ohio, assignors to Parker Sweeper Company, Springfield, Ohio, a corporation of Ohio Application February 7, 1952, Serial No. 270,323

4 Claims. (Cl. 180—19)

The present invention relates to apparatus such as floor sweepers and the like on which a power unit is carried for driving the machine and more particularly to a clutching arrangement utilized as a means for manually raising and lowering the driving wheels for intermittent driving of the sweeper.

To adapt a power unit to a push-type floor sweeper, it is desirable to utilize a vertically adjustable rear frame section provided with auxiliary driving wheels. One of the objects of the present invention is to provide a power unit which can be embodied in the form of an attachment having its driving wheels adapted for driving the sweeper in a straight line, without steering manipulations by the operator.

Another object of the present invention is to provide a power unit for sweepers having a clutching arrangement for manually raising the driving wheels from the surface being swept thereby providing a means for intermittently driving the sweeper.

Still another object of the present invention is to provide a clutching arrangement for manually raising the driving wheels from the surface being swept, thereby facilitating the turning and steering of the sweeper.

Further objects and advantages of the present invention will be apparent from the following description, reference being had to the accompanying drawings wherein a preferred form of embodiment of the invention is clearly shown.

In the drawings:

Fig. 1 is a perspective view of our invention, showing the same applied to a floor sweeper;

Fig. 2 is a partial rear elevational view of our invention, with the driving wheels in the idling position;

Figure 3:
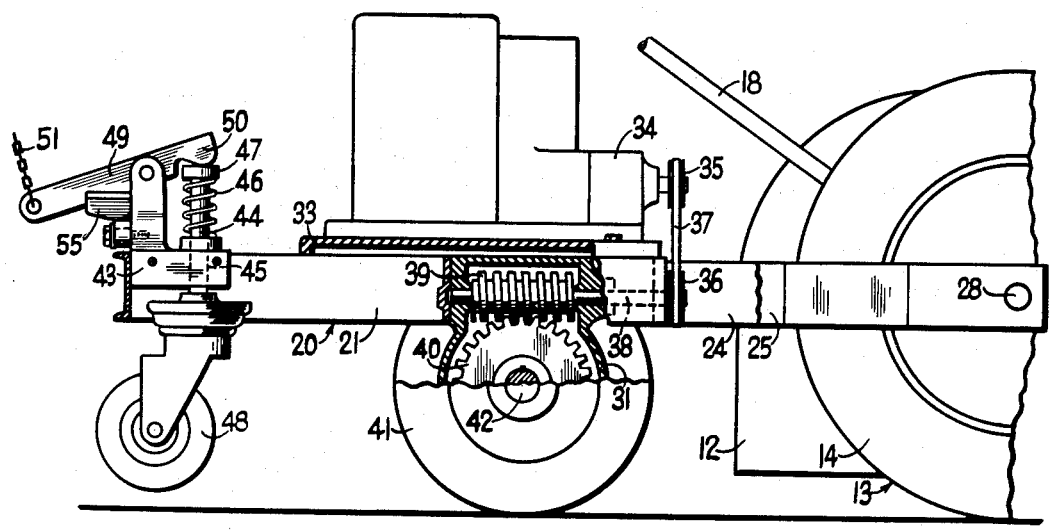
Fig. 3 is a side view, partially in section and partially in elevation, the sections being taken substantially along the line 3—3 of Fig. 1 and 3'—3' of Fig. 2, and showing the elements of the driving mechanism arranged in the driving position.

Referring more in detail to the drawings, we have chosen to illustrate our present invention in connection with a floor sweeper which is more clearly shown and described in co-pending application of the applicants, Serial No. 49,788, filed September 17, 1948 now Patent No. 2,689,367.

In the accompanying drawing the sweeper shown in Fig. 1 includes a main frame 12 carried by wheels 13 which may be encased in rubber tires 14. These wheels drive a main rotary brush carried transversely by the main frame. A debris receptacle is carried by the frame in a position forward of the main brush. A handle 18 is provided for manipulating the sweeper. Auxiliary brush 16 is mounted forwardly of the main brush for sweeping near walls and in corners.

The main frame 12 could be an integral structure, but in the preferred embodiment, we desire to construct the main frame of two major sections, namely, a front section or sweeper section 19 and power driving section 20.

Referring particularly to the power drive arrangement, a rear frame section indicated generally at 20 in Fig. 1 comprises a U-shaped member 21 having its forward ends permanently fastened to a lateral member 22.

Two L-shaped members 23 and 24 are bolted to the forward side of lateral member 22 and are provided with holes 25 for receiving bolts 28 for pivotally mounting the rear frame section 20 to the forward frame section 19.

Longitudinal members 29 and 30 are fastened between the rear end of U-shaped member 21 and lateral member 22. These longitudinal members carry the drive housing 31 which encloses the driving gears 39 and 40, shown in Fig. 3.

A power unit mounting plate 33 is mounted on the top of frame members 21 and 22 and is also secured to drive housing 31 by bolts 17 and thereby providing a rigidly fastened top cover for the housing. By so positioning the power unit mounting plate, the power unit 34, mounted rigidly thereon, can smoothly and efficiently transmit power to the driving means by V-pulleys 35 and 36 and V-belt 37.

Referring to Fig. 3 it is seen that the driven V-pulley 36 is mounted on the end of shaft 38 which carries worm gear 39 for driving the driven gear 40. The driving wheels 41 are rigidly fastened on the ends of laterally extending axle 42 which fixedly carries the driven gear 40 at its center intermediate the wheels. Thus it may be seen that the power unit rotates shaft 38 and worm gear 39 which drives gear 40, thereby rotating axle 42 and driving wheels carried thereon.

Figure 4:
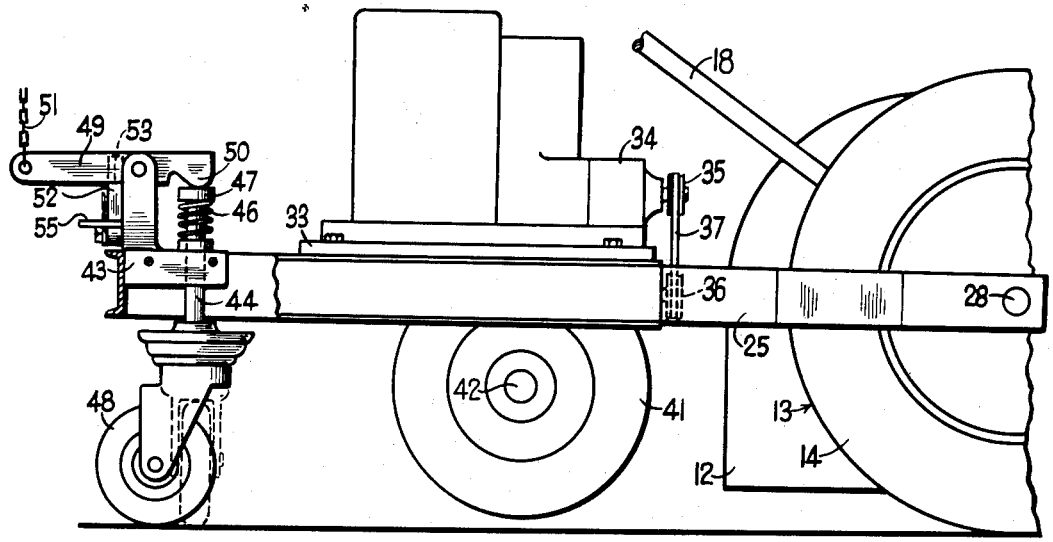
Fig. 4 is a side view, partially in section and partially in elevation, the section being taken substantially along the line 3—3 of Fig. 1, and showing the elements of the driving mechanism arranged in the idling position.
Figure 5:
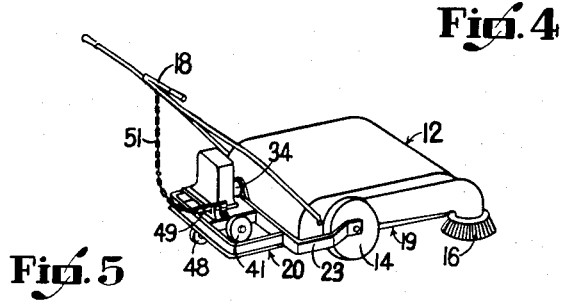
Fig. 5 is a second perspective view of our invention.

A castor mounting member 43 is rigidly fastened rearward of the housing between longitudinal frame members 29 and 30. A vertical shaft 44 is slidably carried by the castor mounting member 43 in the bearing hole 45, and is urged constantly upward by spring 46 which is retained on the shaft by a nut and a washer, seen at 47. A castor wheel 48 is mounted on the lower end of shaft 44, and is held away from floor contact when spring 46 is unopposed so that the shaft 44 is moved to the upper limit of its slidable mounting, as may be seen in Fig. 3. The castor wheel 48 is moved to contact the floor by actuation of a lever 49 carried by the castor mounting member 43. Lever 49 is arranged so that its forward end 50 engages the top of shaft 44 and so that when chain 51 is manually pulled, the shaft and castor will be moved downwardly to contact the floor, thereby raising the rear frame section and the driving wheels upwardly, so that the driving wheels are no longer in contact with the floor, as seen in Fig. 4. A laterally extending lever 52 is mounted, at its fulcrum to the castor mounting member and is provided with notch 53 to engage the first mentioned lever 49. When the levers are engaged as seen in Fig. 2, the castor 48 is held in contact with the floor, and driving wheels 41 are held in an idling position.

A spring 54 is provided to urge the laterally extending lever 52 away from the latching position with the first mentioned lever 49. One end of chain 51 is attached to the rear end of lever 49 and the other end is fastened near the upper end of the handle so that the chain can be readily grasped. When the chain 51 is pulled, spring 54 urges lever 52 away from the latching position and the rear frame section can be lowered so that the driving wheels engage the floor. Spring 46 will then raise the castor 48 away from floor contact.

A pedal 55 is provided on the end of laterally extending lever 52 so that the lever can be foot actuated in opposition to spring 54 to lockingly engage lever 49, and the vertical shaft 44 is thereby held downward in the idling position, shown in Fig. 4.

To adapt a power driving attachment embodiment to various widths of main sweeper frames, U-shaped member 21 and L-shaped members 23 and 24 are provided with a multiplicity of holes so spaced to register at different spreadings of the L-shaped members.

In operation, the power unit is started with the clutching mechanism locked in the idling position as shown in Fig. 4. To impart forward motion to the sweeper, chain 51 is pulled to disengage the locked levers 49 and 52, and the rotating driving wheels are lowered to contact the surface being swept. The sweeper is thereby driven in a straight line direction. To stop, or before making a turn, chain 51 is pulled to slide shaft 44 downwardly so that castor 48 engages the surface being swept, and the chain is further pulled to raise the driving wheels upwardly to the idling position shown in Fig. 4. The sweeper may then be manually manipulated and turned, as the directionally mounted driving wheels 41 are then in the non-driving position and therefore not in opposition to the turning of the sweeper. Although castor 48 is then contacting the surface being swept, it is pivotally mounted to swivel when the sweeper is turned.

Therefore, it is seen that applicants' invention incorporates a novel clutching arrangement cooperating with a straight line driving power means so that the simple actuation of a pull chain will place the driving unit in an idling position and simultaneously impart directional controllability to the sweeper for steering it and for turning corners.

While the form of embodiment of the present invention as herein disclosed constitutes a preferred form, it is to be understood that other forms might be adopted, all coming within the scope of the claims which follow.

We claim:

1. In a floor sweeper or the like, in combination, a frame with a rearward section thereof pivotally mounted to a forward section; wheels for the frame carried by the forward section; a handle carried by the frame for manipulating the machine; a power unit carried on the rearward frame section; driving wheels mounted on the rearward frame section and driven by the power unit; a castor slidable within certain limits in a mounting on the rearward frame section for raising and lowering said frame section; means constantly urging the castor toward the upper limit in said mounting; a lever pivotally mounted on the rearward frame section and engaging the castor for sliding same; a second lever pivotally mounted to the rearward frame section and engaging the first mentioned lever in a certain position for locking said levers; means constantly urging the second mentioned lever away from said locking position.

2. In a floor sweeper or the like, in combination, a frame with a rearward section thereof pivotally mounted to a forward section; wheels for the frame carried by the forward section; a handle carried by the frame for manipulating the machine; a power unit carried on the rearward frame section; driving wheels mounted on the rearward frame section and driven by the power unit; a castor slidable within certain limits in a mounting on the rearward frame section for raising and lowering said frame section; means constantly urging the castor toward the upper limit in said mounting; a lever pivotally mounted on the rearward frame section and engaging the castor for sliding same; a second lever pivotally mounted to the rearward frame section and engaging the first mentioned lever in a certain position for locking said levers; means constantly urging the second mentioned lever away from said locking position; an element attached to the first mentioned lever for manipulating same and extending to engage the handle.

3. In a floor sweeper or the like, in combination, a frame with a rearward section thereof pivotally mounted to a forward section; wheels for the frame carried by the forward section; a handle carried by the frame for manipulating the machine; a drive housing carried by the rearward frame section; an axle rotatably carried by the drive housing; driving wheels for the sweeper mounted on the axle at the ends thereof; a power unit mounting bracket and a power unit mounted thereon, said bracket being carried by the rearward frame section and by the drive housing and forming the top cover thereof; a driving means operated by the power unit for rotating the driving wheels, said driving means being carried by the drive housing and partially enclosed therein; a vertically extending shaft and a castor wheel mounted on the lower end thereof, said castor wheel being rotatably carried by the rearward frame section and mounted to slide between an upper and a lower limit for raising and lowering the rearward frame section; means carried on the shaft constantly urging the shaft toward the upper limit of the slidable mounting; a lever pivotally mounted to the rearward frame section and engaging the shaft for sliding said shaft; an element for manipulating the lever fastened to the lever and extending to engage the handle; a second lever pivotally mounted to the rearward frame section, and notched to engage and lock the first mentioned lever in a certain position; means carried on the rearward frame section for constantly urging disengagement of said levers from a locked position; means carried by the second mentioned lever for foot manipulation of said second lever.

4. In a floor sweeper or the like, in combination, a frame with a rearward section thereof pivotally mounted to a forward section; wheels for the frame carried by the forward section; a handle carried by the frame for manipulating the machine; a drive housing carried by the rearward frame section; an axle rotatably carried by the drive housing; driving wheels for the sweeper mounted on the axle at the ends thereof; a power unit mounting bracket and a power unit mounted thereon, said bracket being carried by the rearward frame section; a driving means operated by the power unit for rotating the driving wheels, said driving means being carried by the drive housing and partially enclosed therein; a vertically extending shaft and a castor wheel mounted on the lower end thereof, said castor wheel being rotatably carried by the rearward frame section and mounted to slide between an upper and a lower limit for raising and lowering the rearward frame section; means carried on the shaft constantly urging the shaft toward the upper limit of the slidable mounting; a lever pivotally mounted to the rearward frame section and engaging the shaft for sliding said shaft; an element for manipulating the lever fastened to the lever and extending to engage the handle; a second lever pivotally mounted to the rearward frame section, and notched to engage and lock the first mentioned lever in a certain position; means carried on the rearward frame section for constantly urging disengagement of said levers from a locked position; means carried by the second mentioned lever for foot manipulation of said second lever.

References Cited in the file of this patent

UNITED STATES PATENTS

| | | |
|---|---|---|
| 1,871,639 | Waite | Aug. 16, 1932 |
| 2,041,654 | Dame et al. | May 19, 1936 |
| 2,464,980 | Kuehn | Mar. 22, 1949 |

FOREIGN PATENTS

| | | |
|---|---|---|
| 491,330 | France | Jan. 30, 1919 |
| 539,091 | France | Mar. 28, 1922 |
| 551,996 | Great Britain | Mar. 18, 1943 |